United States Patent [19]
Yamamoto

[11] Patent Number: 4,801,237
[45] Date of Patent: Jan. 31, 1989

[54] TRANSPORTATION DEVICE FOR COMMERCIAL AND INDUSTRIAL USE

[75] Inventor: Toshihiro Yamamoto, Tokorozawa, Japan

[73] Assignee: Nissan Motor Co., Ltd., Yokohama, Japan

[21] Appl. No.: 902,628

[22] Filed: Sep. 2, 1986

[30] Foreign Application Priority Data

Sep. 3, 1985 [JP] Japan ................ 60-193153
Mar. 11, 1986 [JP] Japan ............ 61-33932[U]

[51] Int. Cl.$^4$ ............................................. B60B 29/00
[52] U.S. Cl. ...................................... 414/428; 414/21; 414/917
[58] Field of Search ................ 414/21, 426, 427, 428, 414/694, 917

[56] References Cited

U.S. PATENT DOCUMENTS

| | | | |
|---|---|---|---|
| 2,326,684 | 8/1943 | Ross | 414/428 X |
| 2,644,597 | 7/1953 | Lewis | 414/427 |
| 3,500,891 | 3/1970 | Collins | 414/428 X |
| 3,653,527 | 4/1972 | Seymour | 414/427 |
| 3,734,304 | 5/1973 | Cabaniss | 414/428 X |
| 3,830,388 | 8/1974 | Mott | 414/428 X |
| 3,858,735 | 1/1975 | Zrostlik | 414/427 |
| 4,051,966 | 10/1977 | Cotton | 414/428 |
| 4,401,405 | 8/1983 | Ealet | 414/428 |

FOREIGN PATENT DOCUMENTS

| | | | |
|---|---|---|---|
| 1154659 | 4/1958 | France | 414/426 |
| 264922 | 1/1971 | U.S.S.R. | 414/427 |
| 258045 | 8/1971 | U.S.S.R. | 414/427 |
| 403582 | 3/1974 | U.S.S.R. | 414/428 |
| 320796 | 10/1929 | United Kingdom | 414/428 |

*Primary Examiner*—Peter A. Aschenbrenner
*Assistant Examiner*—Thomas A. Rendos
*Attorney, Agent, or Firm*—Foley & Lardner, Schwartz, Jeffery, Schwaab, Mack, Blumenthal & Evans

[57] ABSTRACT

In order to move heavy large diameter tires and the like cargo from a storage site to a work place a cradle adapted to support the cargo is suspended at the end of a foldably linkage arrangement. The linkage arrangement is foldably into a compact form at one end of the vehicle and provided with a servo/damper arrangement which permits the weight of the cargo to be compensated for in a manner which permits the linkage to automatically return the cradle quickly and smoothly to a predetermined height.

14 Claims, 6 Drawing Sheets

4,801,237

TRANSPORTATION DEVICE FOR COMMERCIAL AND INDUSTRIAL USE

BACKGROUND OF THE INVENTION

1. Field of the Invention

The present invention relates generally to a transportation device and more specifically to a device which is particularly useful for moving large, heavy objects such as large diameter coils, reels of wire, cable and the like or tires for large aircraft or earth moving vehicles.

2. Description of the Prior Art

FIG. 1 shows a known manually operated lifter device used for transporting large diameter vehicle tires (merely by way of example) from a storage site to a work place. This device includes a base frame 1 having a pair of essentially parallel arms 2 on which support rollers 3 are disposed. The frame 1 is equipped with casters 4, 5, and 6. One of the casters 6 is operatively connected with a hydraulic cylinder 7 to permit one end of the main frame 2 to be raised and lowered. The pressure in the cylinder 7 is controlled by a manually operated lever 8.

However, this known device, although simple, suffers from the drawback that, when used to transport aircraft tires (for example) from a storage area to the aircraft, it is necessary to then use a hydraulic jack or the like to lift the tire to the appropriate fitting height. This complete procedure requires a considerable expenditure of manpower and lowers the efficiency with which the work is carried out, particularly when the environment in which the work is conducted is somewhat hazardous, as is often the case in factories and in and around multi-engine aircraft.

SUMMARY OF THE INVENTION

It is an object of the present invention to provide an apparatus which enables quick and easy handling of the above mentioned type of objects and which reduces the number of operations and expenditure of manpower.

In brief, the objects of the invention are achieved by an arrangement wherein, in order to move heavy large diameter tires and cargo from a storage site to a work place, a cradle adapted to support the cargo is suspended at the end of a linkage arrangement. The linkage arrangement is foldable into a compact form at one end of the vehicle and is provided with a servo/damper arrangement which permits the weight of the cargo to be compensated for in a manner which permits the linkage to automatically return the cradle quickly and smoothly to a predetermined height. The height of the cradle can be manually adjusted as necessary to facilitate loading and unloading.

More specifically, the one embodiment of the present invention is a transportation device for moving objects comprising a frame on which the object can be supported; a base supported on a vehicle; linkage means interconnecting the base and the frame; a servo device for controlling the orientation of the linkage means with respect to the base; and a balancing device for damping the movement of the linkage means and for exerting a force which tends to return the frame to a predetermined height.

DETAILED DESCRIPTION OF THE PREFERRED EMBODIMENTS

Figure 1:
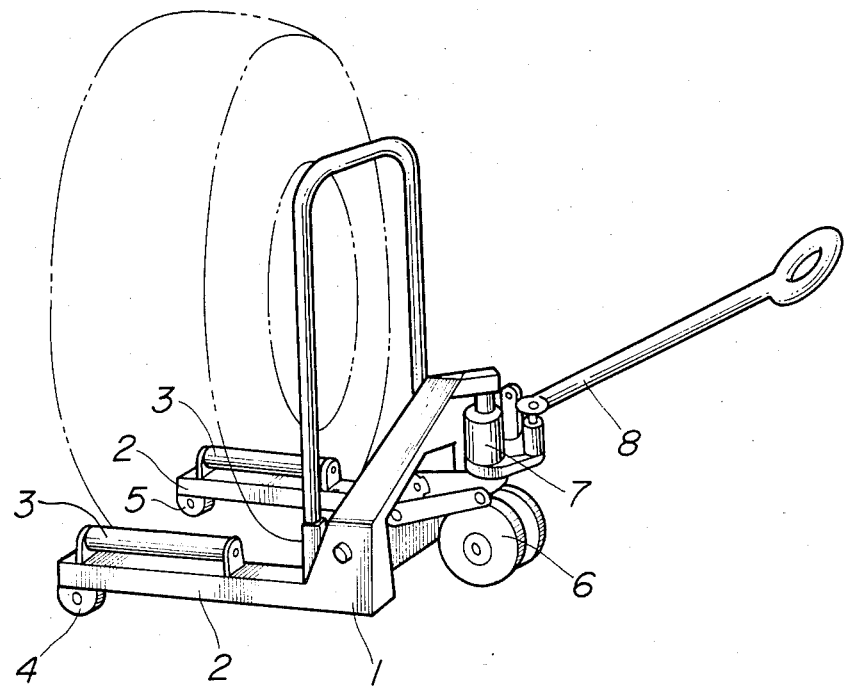
FIG. 1 is a perspective view of a manually operated lifter device.
Figure 2:
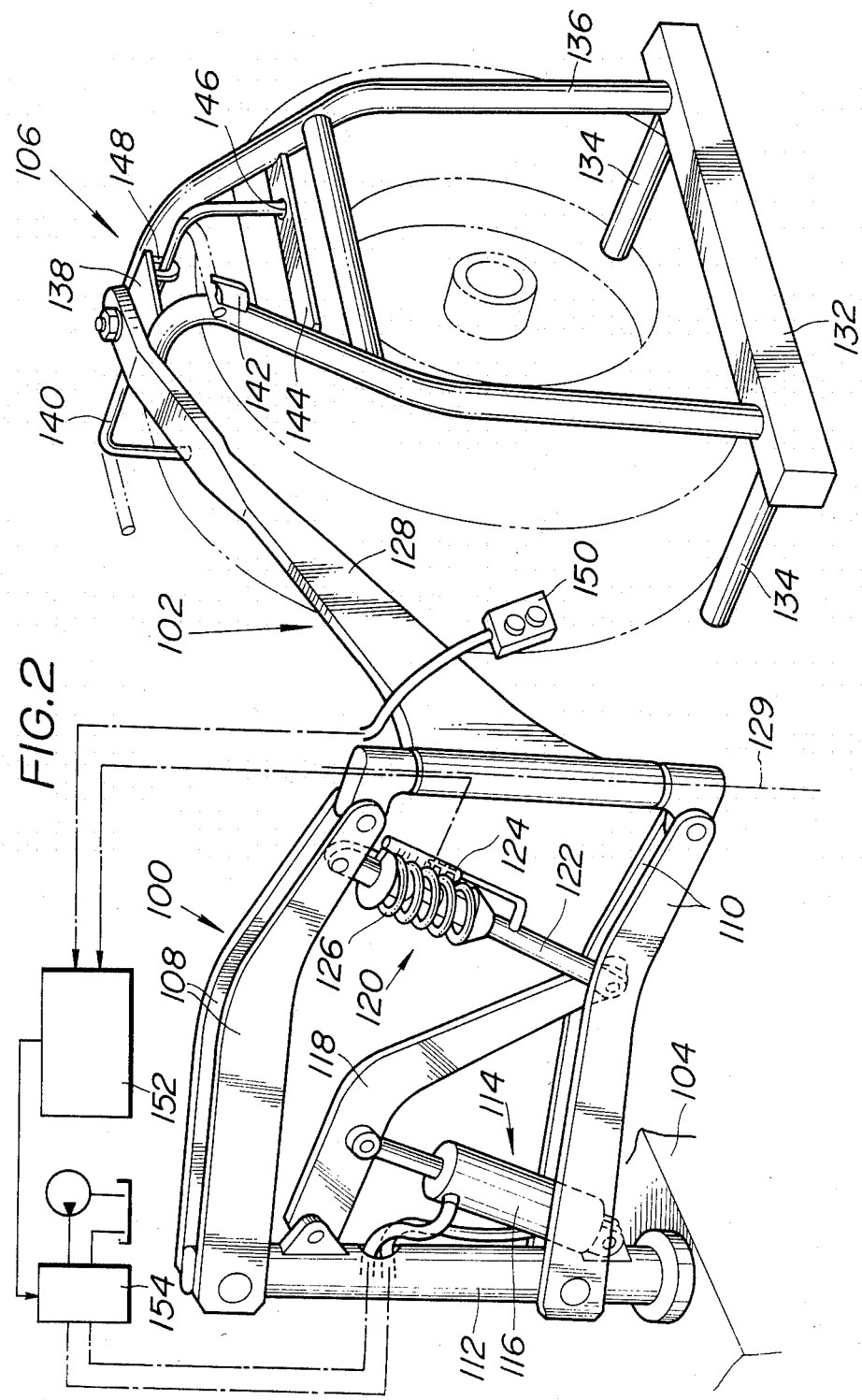
FIG. 2 is a perspective view of a first embodiment of the present invention.

FIG. 2 shows a first embodiment of the present invention. This arrangement includes first and second link sections 100, 102 which operatively interconnect a base 104 and a cradle arrangement 106 which is used to secure and support the object to be moved. The first of the link sections 100 includes first and second parallel links or arms 108, 110 interconnected in the illustrated manner.

The first link section 100 is operatively mounted on a freely rotatable shaft 112 which extends essentially vertically upward from the base member 104.

The device further includes a servo mechanism 114. In this embodiment the servo mechanism is a hydraulic strut or ram 116 which is connected to the shaft 112 and operatively connected with an arm 118. The upper end of this arm 118 is pivotally connected to the shaft 112 as shown.

Interconnecting the lower end of arm 118 and the upper arms 108, of the first link section 100 is balancing arrangement 120 which includes a shock-absorber 122 and a gauge 124 operatively connected to the shock absorber 122 and responsive to the amount of compression of the spring 126. The function of the gauge 124 is described in greater detail below.

Figure 8:
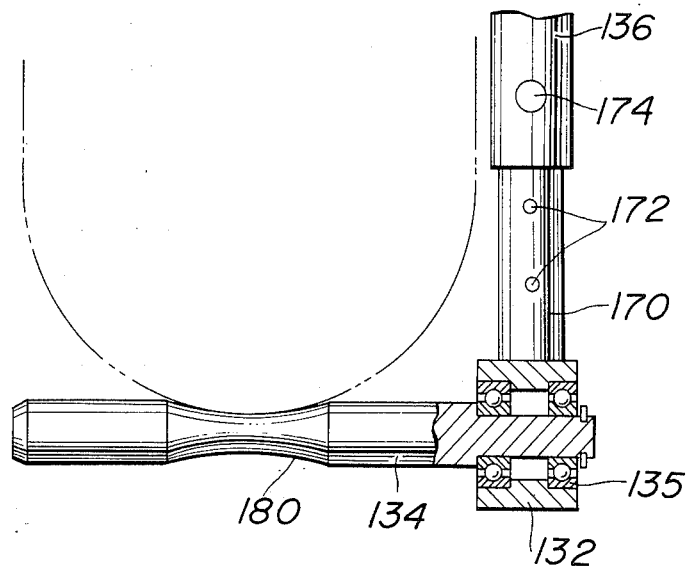
FIGS. 8 and 9 are various side and top views of of the second embodiment.
Figure 9:
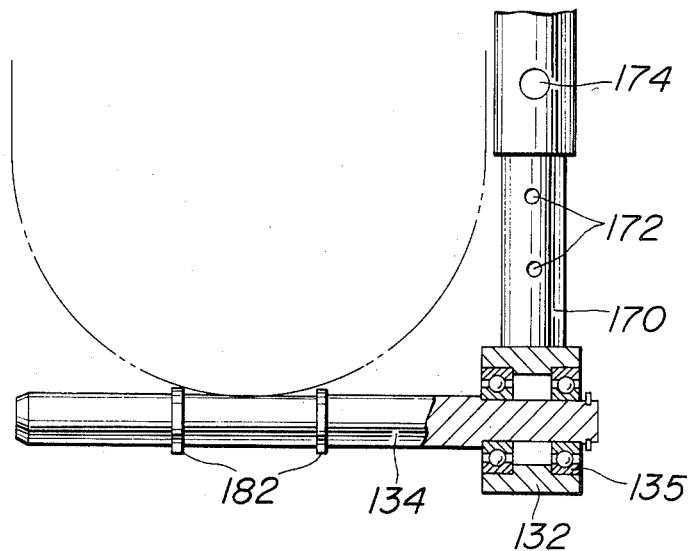

The second link section 102 in this embodiment consists of a single arm 128 which is pivotally interconnected the arms 108, 110 of the first link section 100 so as to pivot about an essentially vertical axis 129. The cradle arrangement 106 is connected to the free end of the arm 128. This cradle includes a base member 132 on which two support rollers 134 are rotatably mounted. The rollers 134 are arranged to extend essentially horizontally from the base member 132. These elements 134 are rotatably supported in the base section by roller bearings 135 in a manner such as shown in FIGS. 8 and 9.

A hollow tubing frame 136 interconnects the base member 132 and a connection plate 138 which is releasably bolted to the free end of arm 128. A retention arrangement comprised of a shallow "U-shaped" bar 140 is pivotally suspended on the lower face of the connection plate 138. This retention member 140 may be manually pivotted from the illustrated position, in which it prevents the cargo supported on the rollers 134 from falling off, to a position (shown in phantom lines), in which easy removal of the cargo is facilitated. A support or holder 142 is welded or otherwise fixed to the hollow tube frame 136 in a manner to support the retention bar in its "open" position. To enable the bar to be locked in a retaining position, a plate 144 is welded to the frame and formed with a through hole 146 through which the end of the bar 140 may be disposed. The brackets 148 which support the bar have elongate openings which permit the bar to be lifted from and lowered into its locking position.

In order to enable ready control of the above described apparatus, a hand controller 150 is operatively connected with a control circuit 152. The hand controller includes buttons which control the raising and lowering of the cradle. The control circuit 152 also receives input signal from gauge 124 and outputs a control signal to a valve 154 which determines the level of hydraulic pressure in the chamber or chambers of the hydraulic ram 116.

During operation the cradle 106 can be lowered (or raised) to a level at which the cargo can be loaded onto the support rollers 134. Once the cargo is loaded into place, the hydraulic strut 116 can be automatically pressurized in a manner to return the cradle 106 to a predetermined height wherein the spring 126 of the shock absorber 122 returns to a predetermined length. If the cradle 106 is lowered from the illustrated position, the shock absorber 122 and hence the spring 126 will be compressed while conversely, if cradle 106 is raised, spring 126 will lengthen. Hence, by limiting the pressurization of the hydraulic ram 116 in response to the gauge 124, which indicates that the spring 126 has returned to a desired elongation overpressurization of the ram may be avoided. If required, further lifting or positional adjustment may be effected by operating the buttons on the hand controller 150.

During raising and lowering of the cradle 106, the shock absorber 122 damps sudden movement of the link sections 100, 102 which might cause undesired movement of the cargo.

Figure 3:
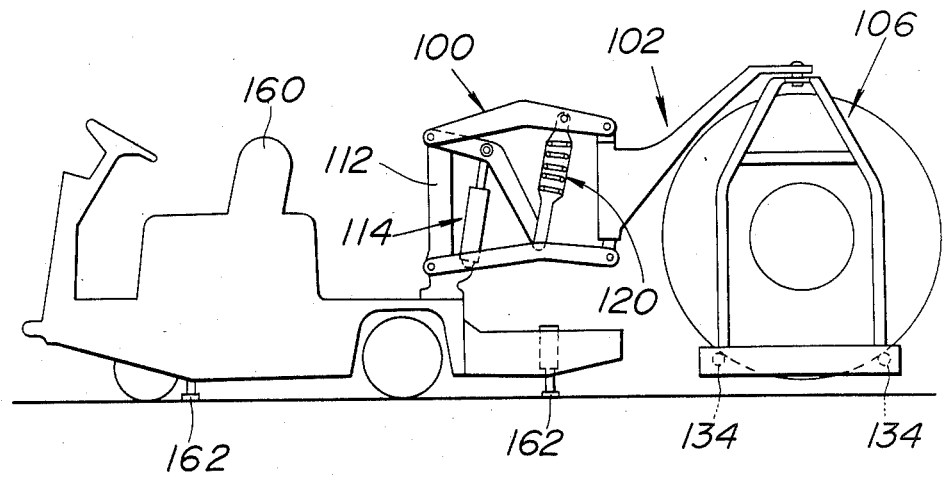
FIGS. 3 to 6 are various side and top views of a the first embodiment mounted on a self-contained vehicle.
Figure 4:
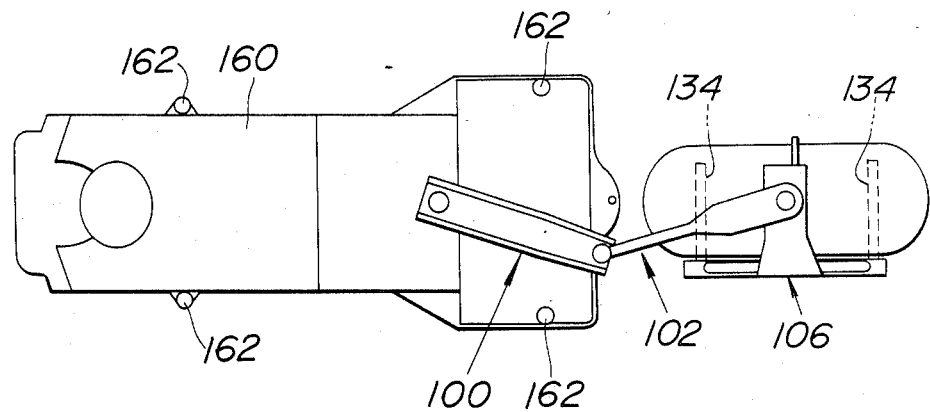
Figure 5:
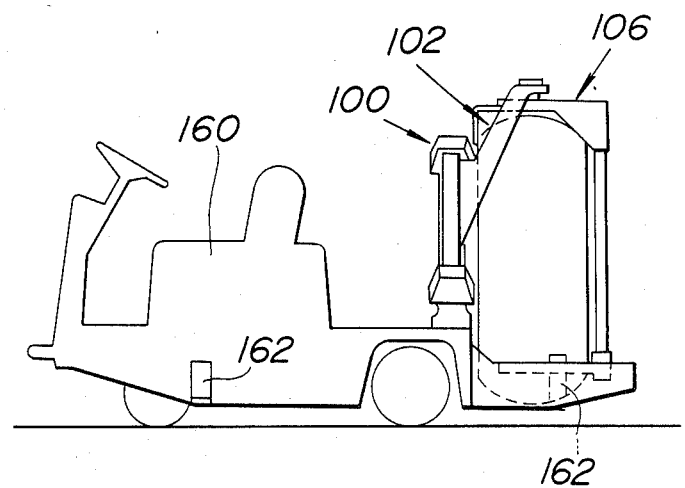
Figure 6:
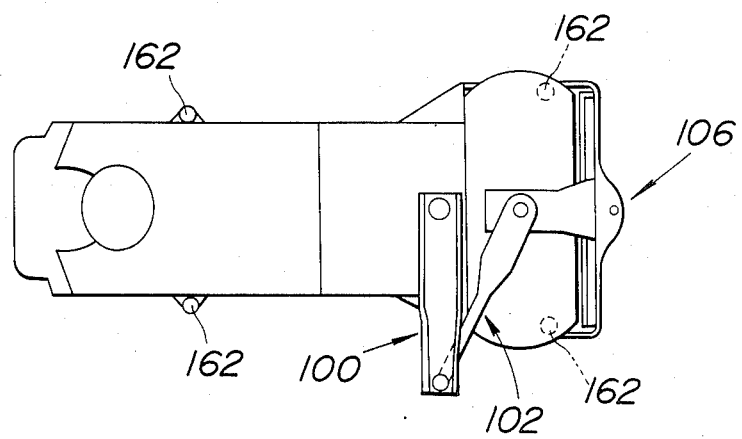

The first embodiment of the present invention is preferably mounted on a self contained vehicle 160 such as in FIGS. 3-6. After the cargo is loaded with the first and second link sections 100, 102 extended as shown in FIGS. 3 and 4, it is possible to "fold" the link section into a compact and stable arrangement at one end of the vehicle 160 such as shown in FIGS. 5 and 6 wherein the cargo is "enclosed" against the end of the vehicle. This arrangement permits the vehicle to be driven relatively quickly and easily from the point of loading to that at which the cargo (an aircraft tire for example) to the site at which it is to be unloaded. At the work site, the tire can be "unfolded", adjusted quickly and easily to the appropriate height and then manually swung into place without the need of additional jacks and the like. Heavy large diameter spools and/or coils may be similarly placed in position in large machines in factories and the like with only minimum risk to the operators.

To facilitate stable loading and unloading of the cargo wherein the linkage arrangements are extended as shown in FIGS. 3 and 4, the vehicle is preferably provided with stands 162 (see FIG. 3).

The present invention is not limited to the illustrated type of vehicle but also may be applied to manually movable trolley type vehicles and the like in the event that the distance over which the cargo must be moved is not substantial or that space does not permit the use of larger vehicles.

Figure 7:
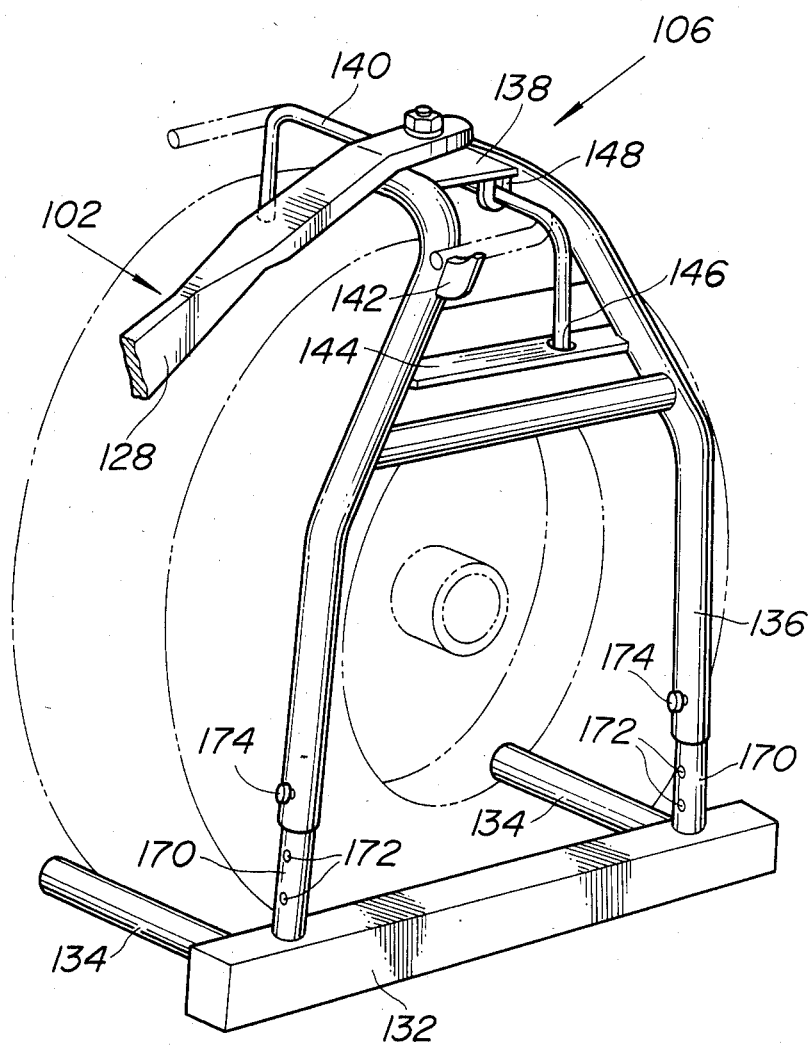
FIG. 7 is a perspective view of a second embodiment of the present invention.

FIG. 7 shows a second embodiment of the present invention. This arrangement is essentially the same as the first one and differs in that the size of the cradle is adjustable. In this arrangement, this size adjustment is achieved by providing the base member 132 of the cradle with short shafts 170 which are telescopically received within the tubing of frame 136. The short shafts 170 are formed with a series of spaced apertures 172 through which pins 174 may be inserted to lock the arrangement in a desired state.

FIGS. 8 and 9 show variants of the second embodiment wherein support rollers are formed with curved recesses 180 (FIG. 8) or radially extending ribs 182 (FIG. 9). The provision of these ribs not only prevent the tire or cargo from slipping during transportation but also facilitate pulling the same from supports in the event that they are temporarily stored in this manner.

What is claimed is:

1. A transportation device for moving objects, comprising:
    a frame on which the object can be supported;
    a base supported on a vehicle;
    linkage means interconnecting said base and said frame; said linkage means comprising:
    a first linkage section comprised of:
    an essentially vertical shaft rotatably mounted on said base, and
    a pair of parallel arms pivotally mounted on said vertical shaft at the first ends thereof; and
    a second linkage section comprised of:
    an arm which is operatively connected to the second ends of said parallel arms so as to be pivotal about an essentially vertical axis;
    a servo device for controlling the orientation of said linkage means with respect to said base; and
    a balancing device for damping the movement of said linkage means and for exerting a force which tends to return said frame to a predetermined height.

2. A transportation device as claimed in claim 1, wherein said servo device comprises:
    a hydraulic strut which is operatively connected between said vertical shaft and one of said pair of parallel arms, said hydraulic strut being selectively elongateable and contractable.

3. A transportation device as claimed in claim 1, wherein said balancing device takes the form of:
    a shock absorber which is operatively interconnected between said pair of parallel arms;
    a gauge which is responsive to a parameter which varies with the degree of compression of said shock absorber; and
    control means which is responsive to the output of said gauge and a manual control unit for controlling the degree to which said servo device exerts a force on said first linkage section.

4. A transportation device for moving objects, comprising:
    a frame on which the object can be supported;
    a base supported on a vehicle;
    linkage means interconnecting said base and said frame;
    a servo device for controlling the orientation of said linkage means with respect to said base; and
    a balancing device for damping the movement of said linkage means and for exerting a force which tends to return the frame to a predetermined height, wherein said vehicle is self-contained and is drivable from one site to another, said vehicle further comprising a structure arranged to cooperate with said linkage means and said frame, said linkage means and said structure being arranged so that said frame can be selectively moved with respect to said vehicle so that it sandwiches the object between said frame and said vehicle whereby driving of said vehicle is facilitated.

5. A transportation device as claimed in claim 4, wherein said frame takes the form of a cradle comprising:

support rollers which are rotatably supported on said base member in a manner to extend essentially horizontally from said base member; and a shaped rod which can be selectively moved between first and second postions, said first position being such that said shaped rod retains the object which is disposed on said support rollers.

6. A transportation device as claimed in claim 5, wherein said cradle includes means for adjusting the size of the cradle in accordance with the size of the object to be transported.

7. A transportation device as claimed in claim 5, wherein said support rollers are shaped in accordance with the type of object which is to be supported thereon.

8. A transportation device as claimed in claim 7, wherein said support rollers include curved recesses for accommodating a curved tire profile.

9. A transportation device as claimed in claim 7, wherein said support rollers each include at least one rib radially extending therefrom near its distal end.

10. A transportation device for moving objects comprising:

a frame on which the objects can be supported;

a base supported on a vehicle;

linkage means interconnecting said base and said frame;

a servo device for controlling the orientation of said linkage means with respect to said base; and a balancing device for damping the movement of said linkage means and for exerting a force which extends to return the frame to a predetermined height, said balancing device comprising a gauge which outputs a signal which varies with the orientation of said linkage means, said gauge being operatively connected for control of said servo device.

11. A transportation device as claimed in claim 10, wherein said balancing device further comprises an extendable strut, said strut being connected with said linkage means and said gauge, said strut exerting a bias on said linkage means which tends to return it to said predetermined height.

12. A transportation device for moving objects comprising:

a frame on which the objects can be supported;

a base supported on a vehicle;

linkage means interconnecting said base and said frame, said linkage means comprising a first section including an essentially vertical shaft and a pair of parallel arms having first and second ends, said first ends being pivotally mounted on said shaft, and a second section including an arm operatively connected to the second ends of said pair of arms so as to be pivotal about an essentially vertical axis;

a servo device for controlling the orientation of said linkage means with respect to said base; and a balancing device for damping the movement of said linkage means and for exerting a force which tends to return the frame to a predetermined height.

13. A transportation device as claimed in claim 12, wherein said frame and said linkage means are adapted to be manually rotated, manually horizontally moved, and mechanically moved in the vertical direction under the control of said servo device.

14. A transportation device as claimed in claim 12, wherein said balancing device includes a shock absorber and a spring in association with said shock absorber.

* * * * *